Jan. 9, 1962 W. H. HARRISON 3,015,987
VENTILATED FRAME FOR LENSES
Filed April 7, 1959 2 Sheets-Sheet 1

Walter H. Harrison
INVENTOR.

BY *Clarence A.O'Brien*
and *Harvey B. Jacobson*
Attorneys

Jan. 9, 1962 W. H. HARRISON 3,015,987
VENTILATED FRAME FOR LENSES
Filed April 7, 1959 2 Sheets-Sheet 2
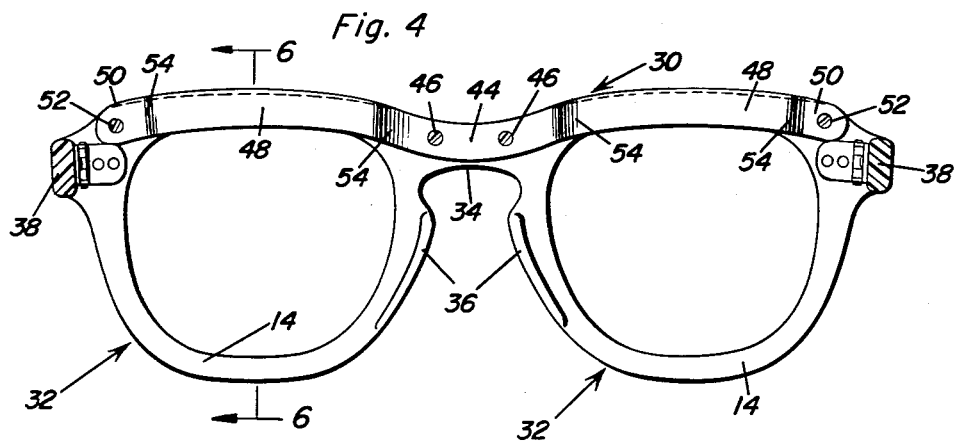
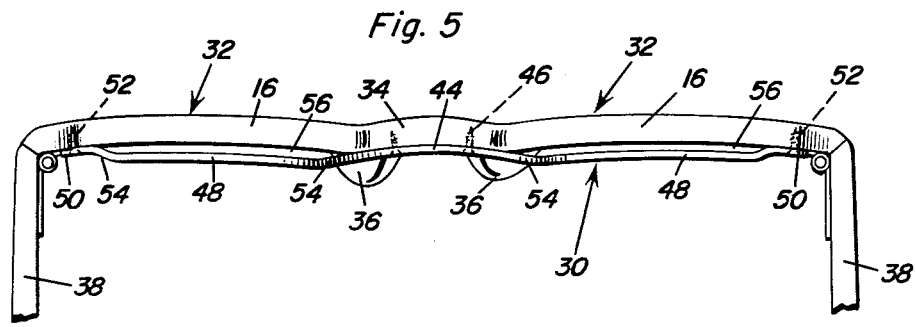
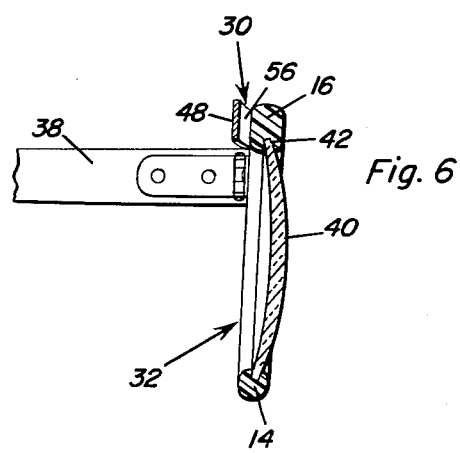
Walter H. Harrison
INVENTOR.

United States Patent Office 3,015,987
Patented Jan. 9, 1962

3,015,987
VENTILATED FRAME FOR LENSES
Walter H. Harrison, Box 111, Post Falls, Idaho
Filed Apr. 7, 1959, Ser. No. 804,712
3 Claims. (Cl. 88—41)

This invention relates to certain new and useful improvements in frames for supporting lenses in front of the eyes of wearers of eyeglasses, spectacles, sun glasses and the like, and the primary object of the concept is to effectually and successfully cope with the ever perplexing, and often dangerous, problem of one's lenses steaming-up and becoming cloudy during temperature changes or from perspiration and resulting condensation and moisture accumulation on the lenses.

Persons who wear glasses are often and unexpectedly confronted with interrupted vision attributable to foggy and cloudy lenses. For example, when a wearer of eyeglasses enters a warm place, a room for example, from a cold outdoor atmosphere, the eyeglass lenses, cold as they are, may become coated with condensation. In fact, any sudden temperature change under many and varying conditions may result in foggy lenses. For instance, making an exit from a refrigerated room into a comparatively warm area, or even opening a heated oven door may result in one's lenses steaming-up. Profuse perspiration is also a source of similar annoyance, and so on. While these annoyances are apparently not so prevalent when rimless glasses are being worn, they are seemingly encountered most frequently by wearers of plastic and so-called horn-rim frames, particularly where the top portions of the rims come into contact with the wearer's brow. However, and despite the objectionable consequences little, if any, efforts appear to have been made by others to cope with the problem. It follows that the objective herein under advisement is to provide lens-retaining rims with venting means so that the air circulation promoted will set up satisfactory movement of air for ventilation needs. Consequently, moisture accumulation and depositing thereof on the lenses will be reduced to an appreciable minimum and clearer vision will be had.

In carrying out a preferred embodiment of the concept only the upper horizontal rim portions are modified. Broadly, these rim portions are provided with ventilating means and the latter may be built-in, so the speak, or added by way of a simple and economical vent-defining attachment.

More specifically, the invention has to do with a frame having lens-retaining rims wherein the upper members or portions thereof are provided with vents, preferably elongated, which span the brow portions rearwardly thereof and which are spaced forwardly of said brow portions to promote unhampered air circulation and resulting ventilation.

Other objects, features and advantages of the invention will become readily apparent from the following specification and the accompanying drawings.

In the drawings, wherein like numerals are employed to designate like parts throughout the views:

FIG. 4 is a rear elevational view revealing a modified form of the inventive concept.

FIG. 5 is a top plan view of the modification seen in FIG. 4.

FIG. 6 is a section on the vertical line 6—6 of FIG. 4.

Figure 1:
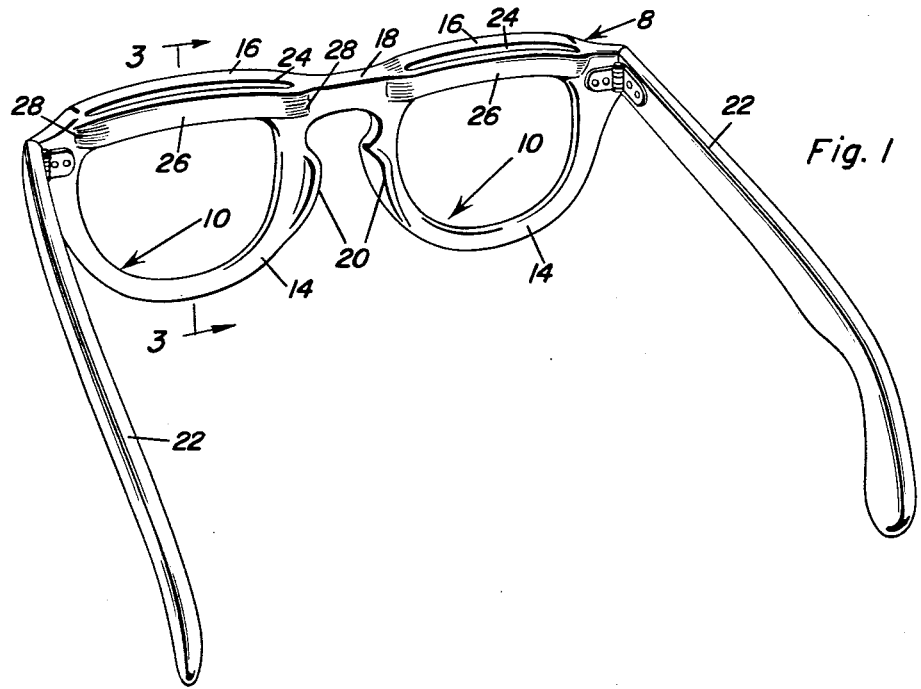
FIG. 1 is a perspective view of a conventional-type frame such as is used to support and retain a pair of lenses in a customary manner, said frame embodying the improved ventilating means.
Figure 2:
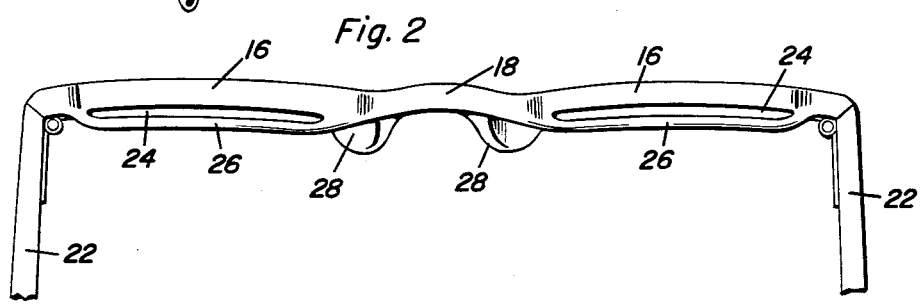
FIG. 2 is a top plan view of the same with portions of the temples or bows broken away.
Figure 3:
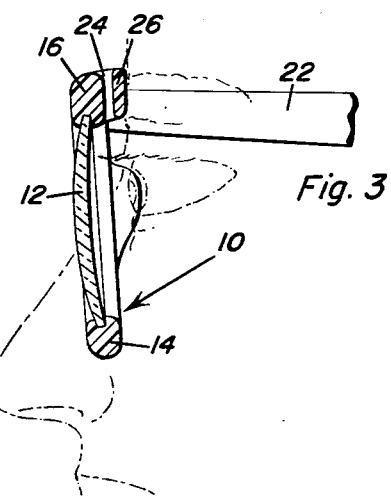
FIG. 3 is a section on the vertical line 3—3 of FIG. 1.

As is evident from the views of the drawings one embodiment or form of the invention is depicted in FIGS. 1 to 3, inclusive and a second form in FIGS. 4 to 6 inclusive. Considered collectively and generically, the disclosure reveals a frame made of moldable commercial plastics or equivalent materials utilized in present-day eyeglasses, spectacles, sun glasses and perhaps in certain types of modified goggles. The essence of the invention revealed in both embodiments is, as already touched upon, present in suitable, practical and economical means whereby the rims of the frame which serve to support and retain the lenses have complemental air circulating and ventilating means.

With reference first to FIGS. 1 to 3 inclusive, the frame, construed as an entity, is denoted by the numeral 8. It is characterized by a pair of rims 10 having inner peripheral grooves (FIG. 3) supporting the lenses 12. Each rim embodies a ring-like portion 14 and an upper generally horizontal rim member 16. The rims are joined by a nose bridge 18 and have suitable cooperating rests 20. The hinged temples or side bows, also conventional, are denoted by the numerals 22. The ventilating means, broadly construed, is cooperatively associated with the upper rim portion. Stated otherwise each rim member has a vent 24 comprising an elongated slot which spans the rim in the manner shown. The rim member may be molded from plastics or equivalent material and the slot formed therein at the same time; or, it would be within the purview of the invention to add a horizontal brow contacting bar or an equivalent element 26, the same being joined at its respective ends as at 28 and being spaced from the rim member 16 to thus provide an intervening vent or slot 24. It follows that the air circulating and ventilating means may be said to be built into the rim portions of the frame.

As previously suggested, it is within the purview of the invention to resort to the use of an attachment such as for example the plastic, metal or equivalent elongated strip member 30 seen in FIGS. 4 to 6 inclusive. Instead of applying individual bar attachments as at 26 in FIG. 1, it is believed to be more feasible and practical to utilize a one-piece strip of plastic which is of a length commensurate with the length of the frame in the manner shown. In any event the lens supporting rims are here designated by the numeral 32, are joined by a nose bridge 34 and are provided with rests 36. The usual temples or bows 38 are provided and hingedly mounted. The lenses 40 are mounted in grooves 42 as seen in FIG. 6. In other words, the frame here is the same as that already described in the differences in the attachment 30. The attachment 30 has a central or median portion 44 secured to the nose bridge by screws or equivalent fasteners 46. Each spacing and vent forming portion is denoted at 48 and corresponds to the part 26 already described. The end portions 50 of the strip are offset and secured by fastenings 52. The bent portions 54 serve to space the members 48 and the members 48 in turn define the venting or ventilation slots 56.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A frame for spectacles comprising a pair of coplanar conventional-type longitudinally spaced endless rims joined by a nose bridge, each rim having a hingedly connected temple, an inner peripheral endless groove with a lens fitted and retained therein, each rim also having an upper horizontal member increased in cross-sectional thickness and having an air circulating vent, said vent being relatively long and extending uninterruptedly the length of said upper horizontal rim member and situated so that its locale when the spectacles are in use is between the lens groove in the upper portion of the rim and the horizontal part of the rim which customarily resides in contact, or nearly so, with the wearer's eyebrows.

2. The structure defined in claim 1 and wherein said vent comprises an elongated slot, said slot being formed in the thickened portion of said horizontal member.

3. A frame for spectacles comprising a pair of coplanar conventional-type longitudinally spaced endless rims having upper horizontal rim members joined by an intervening nose bridge, said rims having hingedly connected temples, each rim having an inner peripheral groove with a lens fitted and retained in the groove, the upper horizontal members of said rims each having an air circulating vent cooperable therewith, said vent being of a length commensurate with the length of said upper horizontal rim member and situated so that its locale when the spectacles are in use is between the rearward surfaces of said lenses and rearward surfaces of the upper horizontal members which customarily reside in contact with the wearer's eyebrows said vents being formed by an elongated strap member having a median portion affixed to a rear surface on the nose bridge and also end portions bent rearwardly and spaced lengthwise from the respective rear surfaces of said horizontal members, whereby the spaces thus defined provide ventilating slots.

References Cited in the file of this patent

UNITED STATES PATENTS

| | | |
|---|---|---|
| 1,518,385 | Boutelle | Dec. 9, 1924 |
| 1,886,410 | Malcom | Nov. 8, 1932 |
| 2,197,682 | Brown | Apr. 16, 1940 |
| 2,224,793 | Malcom | Dec. 10, 1940 |
| 2,344,230 | Brown | Mar. 14, 1944 |
| 2,482,195 | Martin | Sept. 20, 1949 |
| 2,608,687 | Ellis | Sept. 2, 1952 |
| 2,639,429 | Lundberg | May 26, 1953 |
| 2,919,622 | Hensoldt | Jan. 5, 1960 |

FOREIGN PATENTS

| | | |
|---|---|---|
| 358,996 | Germany | July 10, 1921 |
| 263,067 | Switzerland | Nov. 1, 1949 |
| 1,038,685 | France | May 13, 1953 |